United States Patent [19]

Hagel, Sr. et al.

[11] Patent Number: 4,700,297

[45] Date of Patent: Oct. 13, 1987

[54] RELOCATION MANAGEMENT AND REPORTING SYSTEM

[75] Inventors: Robert J. Hagel, Sr., Brookfield, Conn.; Ronald W. Sella, Hopewell Junction, N.Y.

[73] Assignee: Merrill Lynch Relocation Management, Inc., White Plains, N.Y.

[21] Appl. No.: 650,640

[22] Filed: Sep. 14, 1984

[51] Int. Cl.[4] .................. G06F 15/20; G06G 7/52
[52] U.S. Cl. ........................ 364/408; 364/401
[58] Field of Search ................ 364/401, 406, 408

[56] References Cited

U.S. PATENT DOCUMENTS 4,346,442  8/1982  Musmanno ................ 364/408

*Primary Examiner*—E. A. Goldberg
*Assistant Examiner*—Lincoln D. Donovan
*Attorney, Agent, or Firm*—Hopgood, Calimafde, Kalil, Blaustein & Judlowe

[57] ABSTRACT

A relocation management and reporting data processing system processes reimbursement requests for employees who have been transferred. The system includes a data base for storing and retrieving information characterizing, inter alia, the transferred employee, the types of expenses which will be reimbursed, the limits of reimbursement for each expense and/or employee category, the amount spent to date in each category and mortgage data relating to the transferred employee's old and new dwellings. Set up, data entry and reporting proceeds through a series of nested menus which may be individually and directly addressed. Upon entry of a request for reimbursement, the data and expense category are verified and the expense category limit and the amount spent to date are retrieved and processed to authorize or reject the underlying reimbursement request. The system also permits an allowance to be calculated for the reimbursement of increased mortgage interest paid on the new dwelling. The allowance is calculated in accordance with predefined reimbursement policies entered into the data base.

7 Claims, 2 Drawing Figures

*OTHER EXPENSE PROCESSING*

RELOCATION MANAGEMENT AND REPORTING SYSTEM

BACKGROUND AND SUMMARY OF THE INVENTION

This invention relates to business systems and, more specifically, to an improved data processing arrangement for providing a relocation management and reporting system for personnel movement, e.g., employees transferred from one location to another.

Supervising reimbursement paid to relocated employees, and administering and recording of expenses incurred in the transfer, can be time consuming and burdensome to an organization which frequently transfers employees. Maintaining consistent relocation reimbursement policies within an organization can be especially difficult where individual evaluation of the submitted expenses is required. One person evaluating a particular request may allow it while another evaluator may not—a condition giving rise to employee dissatisfaction and morale problems. Moreover, the permissible benefits for relocation may vary depending upon the employee's job level status further complicating expense reimbursement administration. Finally, different organizations may have different policies, standards and procedures and thus may provide different amounts of reimbursement for different categories. Accordingly, it is desirable to provide a relocation management and reporting system which is adaptable to varying company needs and which is operable without the need for substantial management supervision.

The payment of differential mortgage expenses attendant the sale of the employee's house in the old location and the purchase of a house in the new location presents particularly difficult problems. Rarely is it found that the transferred employee purchases a house for the same price and the same mortgage rate as his previous home. Frequently one or both of the first and second houses may have more than one mortgage at differing rates and terms. Additionally, if the employee desires to "trade up" or purchase a more expensive home, the employer may not wish to provide a relocation benefit for the increased equity on the new home.

Accordingly, it is an object of this invention to provide an automated relocation management and reporting system.

It is another object of this invention to provide an automated relocation management and reporting system in which the reimbursement policies may easily be defined, altered, maintained and consistently applied.

Another object of this invention is to provide an automated relocation management and reporting system which can be operated by relatively unskilled operators, and which does not require inordinate management supervision.

It is another object of this invention to provide an improved management and reporting system in which the relocation reimbursement benefits may be made dependent upon the job level of the employee.

Still other objects of this invention will become apparent upon a reading of the detailed specification to follow.

To these ends, a relocation management and reporting system for processing reimbursement requests for employees who have been transferred is provided. The system includes a data base for storing and retrieving information regarding such as the transferred employee, the types of expense which will be reimbursed, the limits of reimbursement for each expense category, running sub-totals of amounts spent to date for each category, and mortgage data relating to the transferred employee's old and new dwellings. Set up, data entry and reporting proceeds through a series of nested menus that may be individually and, optionally, directly addressed. Upon entry of a request for reimbursement, the data and expense category is verified and the expense category limit and the amount spent to date are retrieved and processed to determine if the predetermined limits have been exceeded. Among the expense categories, the system permits reimbursement for increased mortgage interest paid on the new dwelling. All authorized allowances are calculated and paid in accordance with predefined reimbursement policies enters into the data base.

BRIEF DESCRIPTION OF THE DRAWINGS

For a fuller understanding of this invention, reference is had to the following description taken in connection with the accompanying drawing of the preferred embodiments, in which.

DESCRIPTION OF THE PREFERRED EMBODIMENTS

Figure 1:
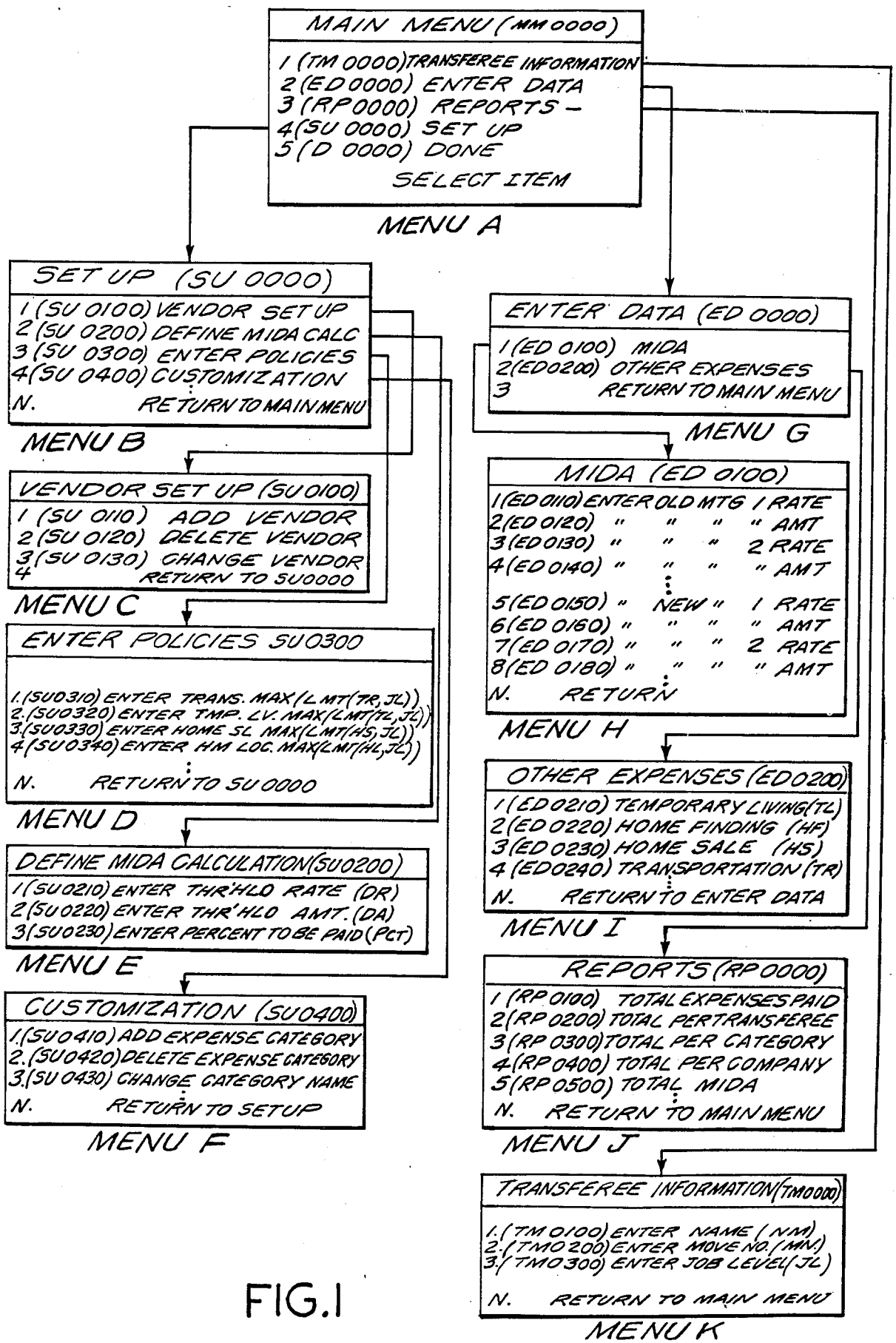
FIG. 1 illustrates a hierarchy of nested set-up, data entry and report menus (only one menu appearing at any one time on a cathode ray tube screen to the operator)

A data process system for overseeing and implementing a personnel relocation expense management and reporting system includes a memory or data base for storing operative reimbursement plan criteria established by the plan operator, policy limits typically for each category of reimbursement expense, informational data characterizing each subscriber and each move, and the like. The system may be implemented by any digital data processing equipment per se well known to those skilled in the art, e.g., any common bus system interconnecting a digital processor, manual data entry terminal apparatus, one or more memories (one of which contains the controlling program), and output signalling structures such as a cathode ray tube display and printer. In operation, the user first enters his policy criteria to tailor the general system to his unique set of reimbursement criteria. Following this, separate requests for expense recovery are submitted by a transferred employee and are processed by the data processing equipment. Those expenses which are authorized and which do not violate any limit are reimbursed. Those which do violate limits become the subject of an output message and are not reimbursed unless an override input is effected by the system operator.

The system may be coded in any program language per se well known to those skilled in the art. The process variables may be of any form which accord with the constraints of the particular program language being used and the below listed variables are for purposes of illustration only.

In the operation of a schematic illustrative system the below listed processing variables may be utilized:

| Variable | Functional Description |
|---|---|
| NM, MN | Transferred employee name (NM) and move number (MN). |
| M# | Move number which is a unique transaction number for the system. The unique move number is internally assigned by the system by keeping track of the previous move number assigned and incrementing that value by one. A new move number characterizes each move for each employee. Each unique set of NM and MN gives rise to a distinct M#. |
| JL | Job level. Typically, more generous reimbursement benefits obtain for more senior employment positions. |
| JL(M#) | A singly indexed scale variable identifying the employee's job level for the move transaction M#. |
| TL(M#) | A temporary living expense for the move transaction M#. Hereafter, each variable indexed by move number (M#) will not be specifically identified, such being understood. |
| STD(TL,M#) | The amount spent to date for temporary living for move number M#. This is the form of a doubly indexed variable. |
| LTD(TL,JL) | A storage variable characterizing the limit or maximum which the plant operator will reimburse for temporary living for an employee holding a job level corresponding to the contents of JL. |
| HL(M#) | House locating expenses. |
| STD(HL,M#) | The amount spent to date for move M# on housing locating expenses. |
| LTD(HL,JL) | The maximum policy bound for house locating expenses for job level JL. |
| HS(M#) | Home sale expenses. |
| STD(HS,M#) | The amount spent to date for home sale expenses for move M#. |
| LTD(HS,JL) | The home sale expense bound. |
| TR(M#) | Transportation expenses attendant a move. |
| STD(TR,M#) | The running accumulation of transportation expenses for a subject move. |
| LTD(TR,JL) | The maximum bound for transportation expenses. |
| AMT | The amount of a reimbursement request. |
| $\phi MRi(M\#), \phi MAi(M\#)$ | The rate and amount of the i-th mortgage on an old home being sold. |
| NMRj(M#),NMAj(M#) | The mortgage rate and amount of the j-th mortgage on a new home being purchased. |
| DR | The system proprietors threshold differential mortgage rate which the |

-continued

| Variable | Functional Description |
|---|---|
| | moving employee will be forced to absorb before reimbursement. |
| DA | The differential mortgage amount between new and old mortgages which the transferee will absorb before mortgage differential payment by the employer. |
| PCT | The percentage of differential interest expense which will be reimbursed. |

To facilitate system set up, entry of information into the data base and processing of relocation expenses, it is desirable to provide relatively simple data entry which may be performed by an unskilled operator without the need for substantial supervision. This simplified operation is effected by a series of nested, hierarchal menus corresponding to the specific data to be entered. Computer system operation utilizing a nested hierarchy of functional menus (enumerations of alternative functional tasks to be performed) is per se well known to those skilled in the art and will not be considered further. To speed data entry and processing, the data processing system of the instant invention permits the operator to transfer directly from any point in any menu to any other point in the same or a different menu without the need to return to and then proceed from the main menu. The data entry arrangement of the present invention thus provides a menu driven but individually addressable scheme for data entry and processing.

FIG. 1 illustrates the hierarchical, tree-like menu arrangement of the present data relocation management and reporting system. It should be noted that the arrangement illustrated in the drawings is for illustrative overview purposes, and only a single menu at a time is displayed as via a cathode ray tube screen to the operator. It is further noted that each displayed line of the menus bears an individual address which may be used when it is desired to jump from any other point in data processing directly to that task. Test instructions (e.g., IF, $\emptyset$N, and the like) for accomplishing such direct functional branching are per se well known to those skilled in the art. Each address generally comprises a string of two letters arranged mnemonically and a four digit numeric code. Each menu or data entry point is addressed by entering an appropriate keystroke, such as "command" and the address desired (i.e., "RP 0000"). Thereafter the appropriate menu or entry line will be displayed.

On the main menu A of FIG. 1 (MM 0000)—the default or start up state of the system, the operator may choose a first option (TM 0000) to enter information (TM 0000) characterizing the employee being transferred. Other options on the main menu provide for entry of data (ED 0000), generation of reports (RP 0000), setup or initialization of the program (SU 0000) for entry of the particular repayment program parameters, and exiting the program upon completion (D 0000).

It is noted that no data entry or processing takes place at the main menu level which serves only as a routing point for the beginning of the hierarchal tree structure of nested subordinate menus. For example, upon selection of the transferee information menu K (TM 0000), the main menu will be replaced by the transferee information data entry menu (TM 0000). As Menue K indicates, the operator may then enter any of the respective data called for on the menu. Such information may include the employee's name (NM), the move number (M#), for that employee, i.e., the number of the subject move (if more than one) for the same employee during the monitored interval (each unique NM and MN being assigned a unique M#), and/or any other information that the employer wishes to utilize or retain regarding the move (e.g., old and new addresses, family size, years with the company, or positions held). Each item on transferee menu TM 0000 also bears an address such as TM 0100, TM 0200, TM 0300, . . . , to permit the operator to jump directly to that particular data entry sequence without passing through the main menu (MM 0000) and all other intermediate menus.

Turning now to the initial setup or definition of the program (SU 0000), we see in Menus B through F that this setup involves a series of nested progressively subordinate menus for the various functions to be performed. The master setup menu B includes vendor identification (SU 0100 of Menu C), an MIDA ("Mortgage Interest Differential Allowance") calculation definition menu (SU 0200 of Menu E), and an entry of reimbursement policies menu (SU 0300 of Menu D, e.g., entry of expense category limits). The setup menu also includes a program customization option (SU 0400—Menu F) for adding, deleting or changing expense categories for which reimbursement will be paid to accommodate individual preferances of system users. Finally, the setup menu B includes an option for return to the main menu.

Menu C of FIG. 1 is the vendor setup menu which is used to add a vendor (selection of SU 0110), delete a vendor (SU 0120), change vendor data (SU 0130), and return to the setup menu (SU 0140), These menus in turn would lead to further menus (not illustrated) for the entry of data with respect to a subject vendor. The provisions for vendor data entry permits payment of moving expenses directly to the provider of such services, such as moving companies or real estate agents, rather than in direct payment via the employee. This assures that the vendor will in fact receive the monies disbursed.

Menu E of FIG. 1 is the submenu (SU 0200) for entering MIDA calculation parameters which is discussed in detail below. This submenu provides for the entry of the mortgage cost differential percentage (PCT) which will be paid by the employer; and the threshold differential interest (DR) and principle (DA) which the employee must absorb before reimbursement begins.

Menu D of FIG. 1 is a submenu (SU 0300) for establishing reimbursement policy with respect to the types and maximum amounts (by expense category) of reimbursement to be paid to the transferee. In this submenu, the types and categories for which payment will be made and the limit amounts for each category, are entered and thus defined to accomomdate individual user preferances. As noted previously, the allowance for each of the categories of expenses that will be reimbursed may vary with the job level (JL(M#)) of the transferee. Accordingly, all of the maximum reimbursement values (LMT) are entered as doubly indexed program variables dependent upon expense type and job level (JL). The operator thus enters via the menu SU 0300 the dollar amounts of the maximum allowance for each expense category for each job level. The standard categories are maximum reimbursable transportation allowance (LMT(TR,JL)); temporary living expense allowance (LMT(TL,JL)); home sale expense allowance (LMT(HS,JL)), and new home locating allowance (LMT(HL,JL)). After limit data entry, an illustrative array of expense limits would be:

|            | Job Level (JL) |        |        |
|------------|------|------|------|
|            | 1    | 2    | 3    |
| LMT(TR,JL) | $1000 | $1500 | $2000 |
| LMT(TL,JL) | 2000 | 3000 | 4000 |
| LMT(HS,JL) | 1500 | 2500 | 3500 |
| LMT(HL,JL) | 750  | 1500 | 3000 |

If other types of expenses are to be added to (or to replace) the list of reimbursed expenses assumed above, this may be accomplished via the customization menu (SU 0400) shown in Menu F which provides for additions (SU 0410), deletions (SU 0420) or changes (SU 0430) of particular expense categories.

Frequently, it is desired that that transferee be reimbursed, at least partially, for the interest rate differential between the mortgage(s) on a former dwelling and the mortage(s) on a new dwelling at the transferred situs. Due to the recent increases in mortgage rates it is likely that the interest rate(s) on the new dwelling will be higher than those of the old home thus increasing the transferee's basic cost of living with no increase in benefit. The recent introduction of "adjustable rate" mortgages serves to further complicate the calculation of appropriate mortgage reimbursement. Accordingly, it is desirable to provide a cash allowance to the transferee for an increase in interest rates between the old and new dwelling. However, where the transferee purchases a new dwelling which is more expensive than the old dwelling, the employer may or may not desire to reimburse the employee for resultant increased mortgage costs. Furthermore, the organization may require that the employee pay a certain portion of the differential interest expenses; or to abosrb threshold amounts of the increase in interest rates or equity amounts.

The mortgage interest differential allowance (MIDA) aspect of the instant program provides a generalized formula for calculating a monthly allowance to be paid the transferee, taking into account the possibility of multiple mortgages on the older and newer dwellings, and as well as the considerations set forth in the preceding paragraph. The constants of the formula (DR, DA, PCT) are defined by the user via SU 0200 processing. The MIDA calculation may be effected as follows:

$$\left( \left[ \frac{(NMA1*NMR1) + \ldots + (NMAN*NMRN)}{\Sigma(NMA1, \ldots, NMAN)} - \frac{(OMA1*OMAM) + \ldots + (OMAM*OMRM)}{\Sigma(OMA1, \ldots, OMAM)} \right] - DR \right) *$$

$$[[\Sigma(OMA1, \ldots, OMAM) - DA]*PCT]$$

In calculating the MIDA formula, first the present effective interest rate on the new dwelling is calculated by summing the amounts and rates of the N-mortgages on the new dwelling [NMA1*NMR1)+(NMA2*NMR2)+ . . . +(NMAN*NMRN)] and dividing by the sum of the principle amounts ($\Sigma$NMA1, ..., NMAN) to provide a weighted average of the present effective interest rate. Similarly, the weighted average of the rate on the previous home is calculated by adding the amounts and rates of the M-older dwelling mortgage(s) [($\emptyset$MA1*$\emptyset$MR1)+($\emptyset$MA2*$\emptyset$MR2)+ ... +($\emptyset$MAM*$\emptyset$MRM)] and dividing by the sum of the amounts ($\Sigma\emptyset$MA1, ..., $\emptyset$MAM). The effective interest rate for the older dwelling is then subtracted from the effective interest rate of the newer dwelling which provides the effective interest rate differential between the old and new mortgages. Subtracted from this differential is the variable DR (if non-zero) which is the value determined by the system user organization to be the rate differential threshold that the transferred employee must absorb. For example, the organization may desire to pay the transfer only if the difference in interest rates is greater than 2%. Thus, in this example, DR (previously entered via SU 0200 data entry) would equal 2%. Some employers will fully reimburse the transferee for the interest rate differential and thus DR in such event equals zero.

After the interest rate differential is calculated, the sum of the amounts of the old mortgages is calculated ($\Sigma\emptyset$MA1, ..., $\emptyset$MAM). The employer may again wish to reimburse for a mortgage amount differential only over a certain predetermined threshold amount. In this event, the threshold amount (contents of program variable DA) is subtracted from the sum of the old mortgages. Again, this DA amount may equal zero if that is the user's policy. Thereafter, the rate calculation is multipled by the mortgage amount calculation, which provides a dollar amount of the reimbursable monthly differential interest payment.

The dollar amount is multiplied by the interest percentage (PCT) which the employer will pay and this represents the Mortgage Differential Interest Allowance (MIDA) to be paid to the transferee. This percentage may be any percentage up to 100%. The result of the MIDA formula is a monthly allowance figure which the employee will receive for increaesd mortgage cost.

It should be noted that the amount on which the allowance is based is calculated on the amount of the old mortgage ($\Sigma\emptyset$MA1, ..., $\emptyset$MAM), not the new mortgage. This means that any increased equity value on the new dwelling will be paid for by the transferee. In certain instances, the employer may desire to reimburse for the increased equity value in which case the new amount ($\Sigma$NMA1, ..., NMAN) would be used rather than the old amount. A predetermined weighted or unweighted average of the old and new mortgage amounts may also be used.

The data processing for applying the MIDA formulas proceeds as follows. The DR, DA and PCT variables, set by company policy, are entered in the Define MIDA Calculation menu E (SU 0200) which is accessed from the Set Up menu B of FIG. 1. In processing a request for an MIDA payment, the MIDA expense data entry menu ED 0100 (Menu H) is accessed from the Enter Data menu Ed 0000 (Menu J). MIDA entry menu ED 0100 (Menu H) permits the operator to enter the variables $\emptyset$MA1, $\emptyset$MA2, ..., $\emptyset$MAM; $\emptyset$MR1, $\emptyset$MR2, ..., $\emptyset$MRM; NMA1, NMA2, ..., NMAN; NMR1, NMR2, ..., NMRN, which are used in the MIDA calculation described above. After the variables have been entered the operative MIDA formula is run. The result is the monthly allowance to be paid the transferee. The data processing may then authorize the issue of payment to the transferee. A cumulative total of the MIDA payments made is stored for reporting purposes and limit evaluation. It is noted that in many instances the old and new mortgage rates and amounts may not vary from month to month and accordingly to facilitate data entry the previous mortgage data entered via MIDA entry menu ED 0100 may be stored in the data base and utilized as default values when accessing MIDA data entry menu ED 0100.

Figure 2:
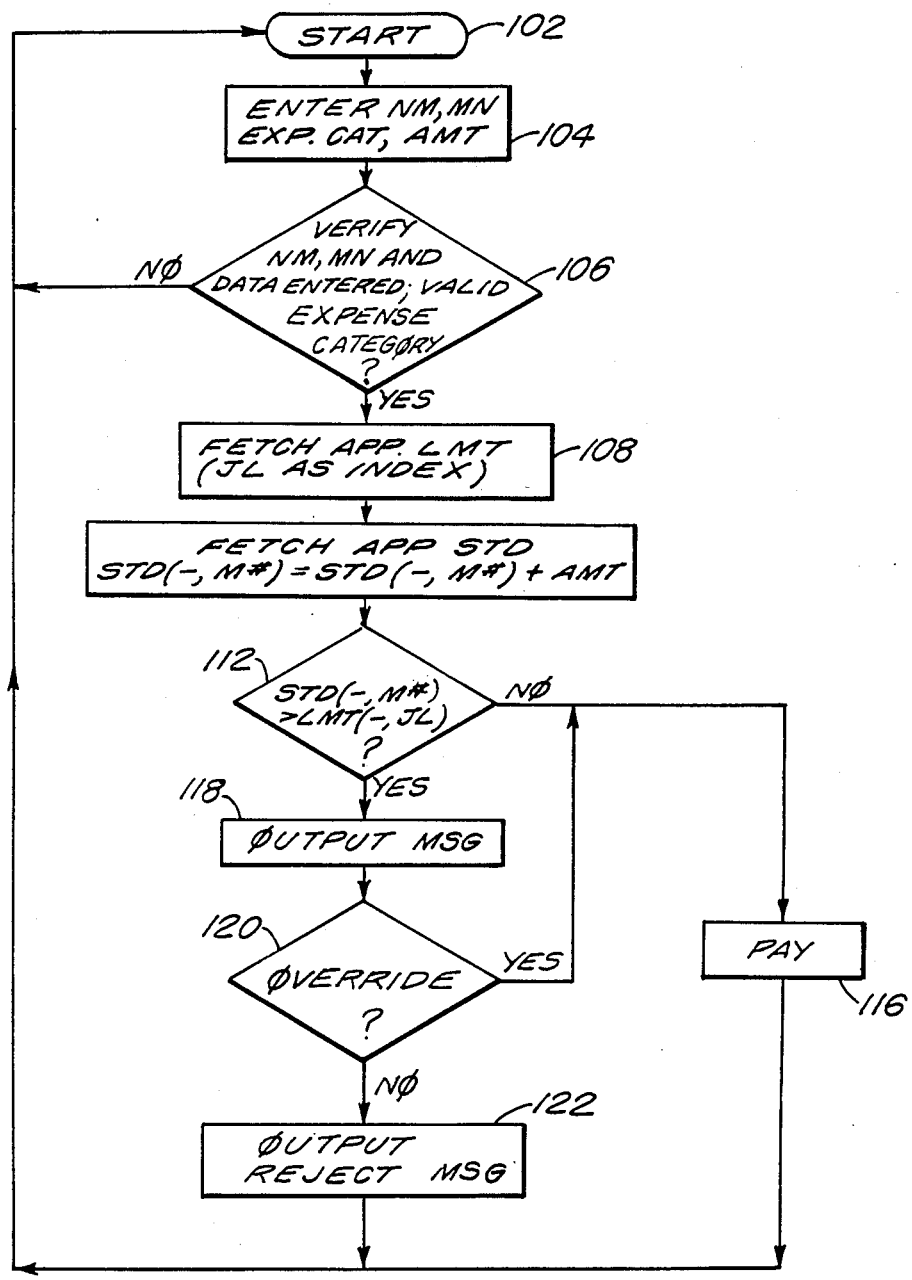
FIG. 2 is a flow chart illustrating data processing upon receipt of a request for expense reimbursement.

FIG. 2 illustrates a schematic form a flow chart of representative data processing upon receipt of a request for payment for any expenses for entry and processing. Proceeding from the start at block 102, the operator enters data (functional block 104) through the series of data entry menus described previously. The data entry includes the name of the employee (MN), the move number (MN), the expense category (TL, HL, HS, TR, ...) and the amount of the expense (AMT). At block 106, the data entered at block 104 is verified to assure that the employee name, move number, and expense category are valid. If the data is not valid, the operator is returned to the start block 102 for entry of valid data. Assuming that the entered data is valid, the processing proceeds to block 108 which retrieves the operative expense limit (LMT(_,JL)) for the expense category and the cumulative category amount spend to date for the move (STD(_,M#) from the data base. The cumulative amount (STD) is then updated for the current AMT expense, as by STD(_,M#)=STD(_,M#)+AMT.

The updated cumulative sum (STD) is next compared with the limit variable (LMT(_,JL)) at block 112. If at block 112, the limit (LMT) is not exceeded [STD(_,M#)$\leq$LMT(_,JL)], a payment authorization message is generated (block 116). Processing flow then returns to start 102 for entry of further data. If the limit (LMT) is exceeded [STD(_,M#)>LMT(_,JL)], a message is supplied to the operator (block 118) informing the operator that the expense limit has been exceeded. The message will contain an inquiry as to whether the operator desires to override the limit in this particular instance. If at block 120 an override message is not received as via the system manual entry device (e.g., keyboard), a final rejection message is generated (including hardcopy if required) indicating that the amount spent to date plug the present amount exceeds the preset limit. The processing flow in either event returns to the start point 102 for further data entry.

As desired, the employer (system user) may obtain reports of varying content on employee move expenses via Reports Menu (RP 0000) illustrated in FIG. 10 which is accessed from the Main Menu (MM 0000). Reports Menu J (RP 0000) may provide summaries of all expenditures (RP 0100), expenses per transferee move (RP 0200 which searches on M#-indexed variables); expenses per category (RP 0300 which searches on STD(_)); and so forth.

The subject employee relocation supervising and accounting system has thus been shown to flexibly accommodate particular requirements of each system user operative from a common underlying program. The arrangement accepts and enters user criteria; and enters data characterizing transferred employees, vendors, and specific expense experiences. Running subtotals of expense categories are maintained on a per-move basis, and compared against operative limits to generate expense acceptance and reimbursement events. Moreover, it is observed that the program operates flexibly, permitting program jumps or transfer from any pont of operation to any other point of operation without proceeding upward through the hierarchy of menus to the main menu A (MM 0000), and then downward through the sub-menus. As just one example among many, an operator may, for example, be entering MIDA definitional information having selected menu point SU 0220 operation Menu E. When complete, he may proceed directly to any other point in FIG. 1. Thus, he may proceed directly from SU 0220 operation to the command point ED 0230 to enter a home sale expense without proceeding through the intervening menu points SU 0200, SU 0000, MM 0000 points if return or default keys are actuated—further proceeding through ED 0000, and ED 0200 to the desired point ED 0230. Similarly, direct transfer can occur from any point in any subordinate or main menu of FIG. 1 to any other functional point and shown directly without proceeding up or down any hierarchal menu tree.

The above described arrangement is merely illustrative of the principles of the present invention. Numerous modifications and adaptations thereof will be readily apparent to those skilled in the art without departing from the spirit and scope of the present invention.

What is claimed is:

1. In combination in a system for processing and supervising a plurality of relocation management and reporting policies for a plurality of transferred employees, said system including:
    (a) data file means including means for storing information regarding the transferred employee, means for storing types of expenses to be authorized for payment, means for storing limit amounts for expenses authorized for payment, and means for storing amounts spent to date in plural expense categories, and mortgage incremented expense;
    (b) manual data entry means for entering data representing amounts incurred for relocation expenses; and
    (c) data processing means including means for veryifing said data entered by comparison with the type of expenses authorized and stored in said data file means, means for retrieving said limit amounts from said data file means, means for summing said expenses entered with said amount spent to date, means for comparing said sum of said expenses entered and said amount spent to date with said limit amount, means for outputting a rejection message if said sum exceeds said limit amount, and means for outputting a payment authorization if said limit amount has not been exceeded by the sum of said data entered and said amount spent to date.

2. The combination of claim 1, further including means for manually overriding said limit amount if the sum of said data entered and amount spent to data exceed said limit amount.

3. The combination of claim 1, wherein said data file means includes data representing the job level of said transferred employee, and said limit amounts comprise an array of limits indexed by job level.

4. The combination of claim 1, wherein said data entry and said data processing means comprises a hierarchical tree of nested functional data processing menus.

5. The combination of claim 4, wherein each said menu includes an individual access address and said data entry and data processing means includes means for directly displaying an individual one of said menus upon operator command by entry of said individual address without requirement for passing through intermediate menus.

6. The combination of claim 1 wherein said data file means includes data representing the allowances to be paid said employees for increased mortgage costs and wherein said data entry means includes means for inputting data representing mortgage interest rates, mortgage principle amounts, and plan reimbursement criteria, said data processing means calculating an allowance to be paid said employee based on said data entry of said rates, amounts and criteria.

7. The combination of claim 6 wherein said data processing means includes means for calculating the weighted average of the interest rates of mortgages on a new dwelling, means for subtracting therefrom the weighted average of the interest rate on an old dwelling, means for subtracting therefrom a predetermined threshold rate of interest retrieved from said data file to thereby provide a calculated rate, means for subtracting an amount retrieved from said data file from the sum of the amounts of the old mortgages to provide a calculated amount, means for multiplying said calculated rate by said calculated amount and for thereafter multiplying by a predetermined percentage retrieved from said data file to thereby an allowance to be paid employee in reimbursement for increased mortgage interest costs.

* * * * *

UNITED STATES PATENT AND TRADEMARK OFFICE
CERTIFICATE OF CORRECTION

PATENT NO. : 4,700,297

DATED : October 13, 1987

INVENTOR(S) : Robert J. Hagel, Sr. and Ronald W. Sella

It is certified that error appears in the above-identified patent and that said Letters Patent is hereby corrected as shown below:

Col. 9, Claim 1, Lines 41-42, change "veryifing" to --verifying--.

Col. 10, Claim 2, Line 7, change "data" to --date--.

Signed and Sealed this

Third Day of May, 1988

Attest:

DONALD J. QUIGG

Attesting Officer

Commissioner of Patents and Trademarks